(12) United States Patent
Le

(10) Patent No.: US 12,119,880 B2
(45) Date of Patent: Oct. 15, 2024

(54) RAPID POLARIZATION TRACKING IN AN OPTICAL CHANNEL

(71) Applicant: Nokia Solutions and Networks OY, Espoo (FI)

(72) Inventor: Thai Son Le, Aberdeen, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/988,874

(22) Filed: Aug. 10, 2020

(65) Prior Publication Data

US 2022/0045766 A1 Feb. 10, 2022

(51) Int. Cl.
| | | |
|---|---|---|
| H04B 10/61 | (2013.01) | |
| H04B 10/077 | (2013.01) | |
| H04B 10/54 | (2013.01) | |
| H04J 14/06 | (2006.01) | |
| H04B 10/50 | (2013.01) | |

(52) U.S. Cl.
CPC ......... *H04B 10/614* (2013.01); *H04B 10/077* (2013.01); *H04B 10/541* (2013.01); *H04B 10/6164* (2013.01); *H04B 10/6166* (2013.01); *H04J 14/06* (2013.01); *H04B 10/503* (2013.01)

(58) Field of Classification Search
CPC ................ H04B 10/077; H04B 10/614; H04B 10/6164; H04B 10/6166; H04J 14/06
USPC .......................................... 398/202, 208–209
See application file for complete search history.

(56) References Cited

U.S. PATENT DOCUMENTS

| | | | |
|---|---|---|---|
| 6,587,190 B2 | 7/2003 | Chae et al. | |
| 6,621,947 B1 | 9/2003 | Tapanes et al. | |
| 7,142,736 B2 | 11/2006 | Patel et al. | |
| 7,209,670 B2 | 4/2007 | Fludger et al. | |

(Continued)

FOREIGN PATENT DOCUMENTS

| | | |
|---|---|---|
| EP | 2796847 A2 | 10/2014 |
| EP | 3404852 A1 | 11/2018 |

(Continued)

OTHER PUBLICATIONS

Wikipedia: Stokes parameters, https://en.wikipedia.org/wiki/Stokes_parameters (Year: 2021).*

(Continued)

*Primary Examiner* — Li Liu
(74) *Attorney, Agent, or Firm* — Mendelsohn Dunleavy, P.C.; Steve Mendelsohn

(57) ABSTRACT

An optical receiver, e.g., for an Optical Supervisory Channel (OSC), whose optical front end comprises a polarization-diversity coherent optical receiver configured to receive a conventional intensity-modulated (e.g., OSC) signal. Four quadrature components of the received OSC signal detected by the polarization-diversity coherent optical receiver are sampled at a relatively high sampling rate and are used to calculate the Stokes parameters of the OSC signal. As a result, the Stokes parameters can be updated at the high sampling rate, which can be suitably selected to enable polarization tracking with a relatively high time resolution and/or at relatively high SOP-rotation speeds. The four detected quadrature components are appropriately combined in the receiver DSP to determine the intensity of the received OSC signal, which is then used in a conventional manner to recover the OSC data encoded therein.

14 Claims, 4 Drawing Sheets

(56) References Cited

U.S. PATENT DOCUMENTS

| | | | |
|---|---|---|---|
| 7,555,227 B2* | 6/2009 | Bontu | H04B 10/2572 398/202 |
| 7,769,305 B1* | 8/2010 | Roberts | H04B 10/6162 398/206 |
| 7,885,539 B2 | 2/2011 | Leppla et al. | |
| 7,940,389 B2 | 5/2011 | Rogers et al. | |
| 7,961,331 B2 | 6/2011 | Healey | |
| 8,682,159 B2 | 3/2014 | Kovsh et al. | |
| 9,337,934 B1* | 5/2016 | Agazzi | H04L 7/0075 |
| 9,712,232 B2 | 7/2017 | Jiang et al. | |
| 9,906,308 B1* | 2/2018 | Pajovic | H04B 10/6162 |
| 10,038,504 B2* | 7/2018 | Winzer | H04B 10/0773 |
| 10,161,798 B2 | 12/2018 | Pei et al. | |
| 10,284,303 B2* | 5/2019 | Zhu | H04L 7/0029 |
| 10,324,002 B2 | 6/2019 | Chen et al. | |
| 10,404,400 B2* | 9/2019 | Chen | H04J 14/0227 |
| 11,309,959 B2 | 4/2022 | Le | |
| 2005/0196176 A1* | 9/2005 | Sun | H04B 10/2572 398/152 |
| 2006/0126993 A1 | 6/2006 | Piede et al. | |
| 2006/0163457 A1 | 7/2006 | Katsifolis et al. | |
| 2008/0152363 A1* | 6/2008 | Koc | H04B 10/695 398/208 |
| 2008/0232795 A1 | 9/2008 | Klar et al. | |
| 2008/0239448 A1* | 10/2008 | Tanaka | G02F 1/2255 359/245 |
| 2009/0148164 A1* | 6/2009 | Roberts | H04B 10/2572 398/65 |
| 2010/0189445 A1* | 7/2010 | Nakashima | H04B 10/65 398/152 |
| 2010/0239254 A1* | 9/2010 | Li | H04B 10/2507 398/65 |
| 2010/0329677 A1* | 12/2010 | Kaneda | H04B 10/60 398/65 |
| 2011/0255870 A1* | 10/2011 | Grigoryan | H04B 10/548 398/65 |
| 2012/0230629 A1 | 9/2012 | Hill et al. | |
| 2012/0315043 A1* | 12/2012 | Nakagawa | H04B 10/5053 398/65 |
| 2013/0181757 A1* | 7/2013 | Calabro | H04L 7/005 327/159 |
| 2013/0336654 A1* | 12/2013 | Arikawa | H04J 14/06 398/65 |
| 2014/0079390 A1* | 3/2014 | Kim | H04B 10/0773 398/30 |
| 2014/0133844 A1 | 5/2014 | Dahlfort et al. | |
| 2014/0260638 A1 | 9/2014 | Hood et al. | |
| 2014/0328588 A1* | 11/2014 | Sakai | H04B 10/63 398/38 |
| 2015/0030331 A1* | 1/2015 | Salsi | H04B 10/6166 398/65 |
| 2015/0043907 A1* | 2/2015 | Cavaliere | H04J 14/0246 398/30 |
| 2015/0131988 A1 | 5/2015 | Alfiad et al. | |
| 2015/0280856 A1* | 10/2015 | Nakashima | H04B 10/6162 398/65 |
| 2016/0182182 A1* | 6/2016 | Schmogrow | H04J 14/06 398/65 |
| 2016/0218813 A1* | 7/2016 | Farley | H04B 10/6166 |
| 2017/0054513 A1* | 2/2017 | Guo | H04L 5/0048 |
| 2017/0126312 A1 | 5/2017 | Maniloff | |
| 2017/0356805 A1* | 12/2017 | Pei | H04B 10/0775 |
| 2018/0198547 A1* | 7/2018 | Mehrvar | H04B 10/616 |
| 2018/0269985 A1* | 9/2018 | Zhu | H04B 10/6165 |
| 2019/0052393 A1 | 2/2019 | Barnard et al. | |
| 2019/0074908 A1* | 3/2019 | Lee | G06F 11/1443 |
| 2019/0101447 A1 | 4/2019 | Pei et al. | |
| 2019/0181950 A1* | 6/2019 | Ishimura | H04B 10/25 |
| 2019/0260493 A1* | 8/2019 | Chimfwembe | H04B 10/032 |
| 2019/0379462 A1* | 12/2019 | Razzell | H04B 10/614 |
| 2019/0393964 A1* | 12/2019 | Tehrani | H04B 10/60 |
| 2020/0044734 A1 | 2/2020 | Parkin | |
| 2020/0052786 A1 | 2/2020 | Menard et al. | |
| 2020/0076508 A1* | 3/2020 | Jia | H04B 10/40 |
| 2020/0106521 A1* | 4/2020 | Ye | H04B 10/0775 |
| 2020/0195354 A1* | 6/2020 | Perin | H04B 10/6151 |
| 2020/0235842 A1* | 7/2020 | Jia | H04J 14/06 |
| 2020/0266887 A1* | 8/2020 | Rudolph | H04B 10/07953 |
| 2020/0328806 A1 | 10/2020 | Shimizu et al. | |
| 2020/0328818 A1* | 10/2020 | Razzell | H04B 10/6162 |
| 2021/0013962 A1 | 1/2021 | Mansouri Rad | |
| 2021/0099234 A1 | 4/2021 | Graceffo et al. | |
| 2021/0376926 A1 | 12/2021 | Le | |
| 2022/0171081 A1 | 6/2022 | Le | |

FOREIGN PATENT DOCUMENTS

| | | |
|---|---|---|
| EP | 3404855 A1 | 11/2018 |
| WO | 2018156132 A1 | 8/2018 |
| WO | WO2020026007 A1 | 2/2020 |
| WO | 2021168033 A1 | 8/2021 |

OTHER PUBLICATIONS

Che, Di, "Coherent Optical Short-Reach Communications", Doctoral Dissertation, University of Melbourne (2016): 135 pages.

Ciaramella, Ernesto, "Polarization-Independent Receivers for Low-Cost Coherent OOK Systems." IEEE Photonics Technology Letters 26.6 (2014): 548-551.

Dorize, Christian, et al., "Enhancing the performance of coherent OTDR systems with polarization diversity complementary codes." Optics Express 26.10 (2018): 12878-12890.

Gordon, J. P., et al., "PMD fundamentals: Polarization mode dispersion in optical fibers." Proceedings of the National Academy of Sciences 97.9 (2000): 4541-4550.

Jignesh, Jokhakar, et al. "Polarization independent optical injection locking for carrier recovery in optical communication systems." Optics Express 25.18 (2017): 21216-21228.

Li, Jie, et al. "Real-time Fast Polarization Tracking Based on Polarization Phase Locking Least Mean Square Algorithm." Optics Express 27.16 (2019): 22116-22126.

Zhang, Jiao, et al. "200 Gbit/s/λ PDM-PAM-4 PON system based on intensity modulation and coherent detection." Journal of Optical Communications and Networking 12.1 (Jan. 2020): A1-A8.

"Fiber Doctor (FD)", www.huawei.com, 2020 [retrieved on Jun. 9, 2020] Retrieved from the Internet: <URL: https://info.support.huawei.com/network/ptmngsys/Web/WDMkg/en/39_fd.html> (4 pages).

"Optical Supervisory Channel (OSC) SFP Transceiver with Integrated Micro-OTDR Now Available from Optical Zonu (OZC)", www.pr.com, 2014 [retrieved on Jun. 8, 2020] Retrieved from the Internet: <URL: https://www.pr.com/press-release/548495> (2 pages).

"OSN 8800—Huawei", www.huawei.com, 2016 [retrieved on Jun. 9, 2020] Retrieved from the Internet: <URL: https://carrier.huawei.com/en/products/fixed-network/transmission/wdm-otn/osn8800> (4 pages).

Roudas, Ioannis "Chapter 10: Coherent Optical Communication Systems." WDM Systems and Networks. Springer, New York, NY. https://doi.org/10.1007/978-1-4614-1093-5_10 (2012): 373-417.

ITU-T, "Spectral grids for WDM applications: DWDM frequency grid." Recommendation G.694.1 (Oct. 2020): 1-7.

Marra, Giuseppe, et al. "Ultrastable laser interferometry for earthquake detection with terrestrial and submarine cables." Science 361.6401 (2018): 486-490.

"What's shaking? Earthquake detection with submarine cables", www.google.com, 2020 [retrieved on Oct. 29, 2020] Retrieved from the Internet: <URL: https://cloud.google.com/blog/products/infrastructure/using-subsea-cables-to-detect-earthquakes> (7 pages).

Šlapák, Martin, et al. "Polarization Changes as Early Warning System in Optical Fiber Networks." 42nd International Conference on Telecommunications and Signal Processing (TSP). Budapest, Hungary. IEEE (2019): 597-600.

Williams, Ethan F., et al. "Distributed sensing of microseisms and teleseisms with submarine dark fibers." Nature Communications 10, Article 5778 (2019): 1-11.

(56) References Cited

OTHER PUBLICATIONS

Mazur, Michael, et al. "Detection of Ambient Disturbances Using Dispersive Delays in Optical Fibers." U.S. Appl. No. 17/580,202, filed Jan. 20, 2022; (33 pages).

Yan, Yaxi, et al. "Distributed vibration sensing based on forward transmission and coherent detection." arXiv preprint arXiv:1907.07675 (2019): 1-8.

Lindsey, Nathaniel J., et al. "Illuminating seafloor faults and ocean dynamics with dark fiber distributed acoustic sensing." Science 366.6469 (2019): 1103-1107.

Zhan, Zhongwen. "Distributed Acoustic Sensing Turns Fiber-Optic Cables into Sensitive Seismic Antennas." Seismological Research Letters 91.1 (2019): 1-15.

Mazur, Mikael, et al. "Correlation Metric for Polarization Changes." IEEE Photonics Technology Letters 30.17 (2018): 1575-1578.

Krummrich, Peter M., et al. "Demanding response time requirements on coherent receivers due to fast polarization rotations caused by lightning events." Optics Express 24.11 (2016): 12442-12457.

Boitier, F., et al. "Proactive Fiber Damage Detection in Real-time Coherent Receiver." European Conference on Optical Communication (ECOC), Sep. 17-21, 2017. Gothenburg, Sweden (2017): 1-3.

\* cited by examiner

200

RAPID POLARIZATION TRACKING IN AN OPTICAL CHANNEL

BACKGROUND

Field

Various example embodiments relate to optical communication equipment and, more specifically but not exclusively, to state of polarization (SOP) measurements.

Description of the Related Art

This section introduces aspects that may help facilitate a better understanding of the disclosure. Accordingly, the statements of this section are to be read in this light and are not to be understood as admissions about what is in the prior art or what is not in the prior art.

A standard single-mode fiber typically supports two modes of propagation distinguished by their polarization. Due to optical birefringence in the fiber, the polarization modes may travel with different group velocities, and random changes in the birefringence along the fiber length typically result in random coupling between the modes. The resulting SOP rotation and polarization-mode-dispersion (PMD) phenomena may lead to signal impairments that can severely limit the transmission capacity of the fiber. Some ambient events, such as lightning or strong mechanical vibration, may even cause the fiber to rotate the SOP at speeds of several Mrad/s, which can trigger an optical-link outage.

SUMMARY OF SOME SPECIFIC EMBODIMENTS

Disclosed herein are embodiments of an optical receiver, e.g., for an Optical Supervisory Channel (OSC), whose optical front end comprises a polarization-diversity coherent optical receiver configured to receive a conventional intensity-modulated (e.g., OSC) signal. In an example embodiment, four quadrature components of the received OSC signal detected by the polarization-diversity coherent optical receiver are sampled at a relatively high sampling rate and are used to calculate the Stokes parameters of the OSC signal. As a result, the Stokes parameters can be updated at the high sampling rate, which can be suitably selected to enable polarization tracking with a relatively high time resolution and/or at relatively high SOP-rotation speeds. The four detected quadrature components are appropriately combined in the receiver DSP to determine the intensity of the received OSC signal, which is then used in a conventional manner to recover the OSC data encoded therein.

Some embodiments may advantageously be used to implement rapid polarization tracking for any slow optical channel employing intensity modulation without the use of polarization division multiplexing (PDM).

According to an example embodiment, provided is an apparatus comprising an optical data receiver for an intensity-modulated optical data signal, the optical data receiver comprising: an optical hybrid configured to mix the intensity-modulated optical data signal and an optical local-oscillator signal to generate first and second pluralities of mixed optical signals, the first plurality corresponding to a first polarization of the optical data signal, the second plurality corresponding to a different second polarization of the optical data signal; a first plurality of light detectors connected to generate first and second streams of digitalizations in response to the first plurality of mixed optical signals, the first and second streams of digitalizations providing measurements of different phase components of the first polarization of the optical data signal; a second plurality of light detectors connected to generate third and fourth streams of digitalizations in response to the second plurality of mixed optical signals, the third and fourth streams of digitalizations providing measurements of different phase components of the second polarization of the optical data signal; and a digital signal processor configured to obtain time-resolved measurements of an SOP of the intensity-modulated optical data signal based on the first, second, third, and fourth streams of digitalizations.

In some embodiments of the above apparatus, the digital signal processor is further configured to recover data carried by the intensity-modulated optical data signal from a combination of the first, second, third, and fourth streams of digitalizations.

In some embodiments of the above apparatus, the digital signal processor is configured to generate said combination to be proportional to optical power of the intensity-modulated optical data signal.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION

In optics, polarized light can be represented by a Jones vector, and linear optical elements can be represented by Jones matrices. When light crosses such an optical element, the Jones vector of the output light can be found by taking a product of the Jones matrix of the optical element and the Jones vector of the input light, e.g., in accordance with Eq. (1):

$$\begin{bmatrix} E_x^r \\ E_y^r \end{bmatrix} = J(\theta, \phi) \begin{bmatrix} E_x^t \\ E_y^t \end{bmatrix} \tag{1}$$

where $E_x^t$ and $E_y^t$ are the x and y components, respectively, of the Jones vector of the input light; $E_x^r$ and $E_y^r$ are the x and y components, respectively, of the Jones vector of the output light; and $J(\theta,\phi)$ is the Jones matrix of the optical element given by Eq. (2):

$$J(\theta, \phi) = \begin{bmatrix} \cos(\theta) & -e^{j\phi}\sin(\theta) \\ e^{j\phi}\sin(\theta) & \cos(\theta) \end{bmatrix} \tag{2}$$

where 2θ and φ are the elevation and azimuth polarization rotation angles, respectively, the values of which can be used to define the SOP. For clarity, the above example of a Jones matrix does not include effects of optical attenuation and/or amplification.

Figure 1:
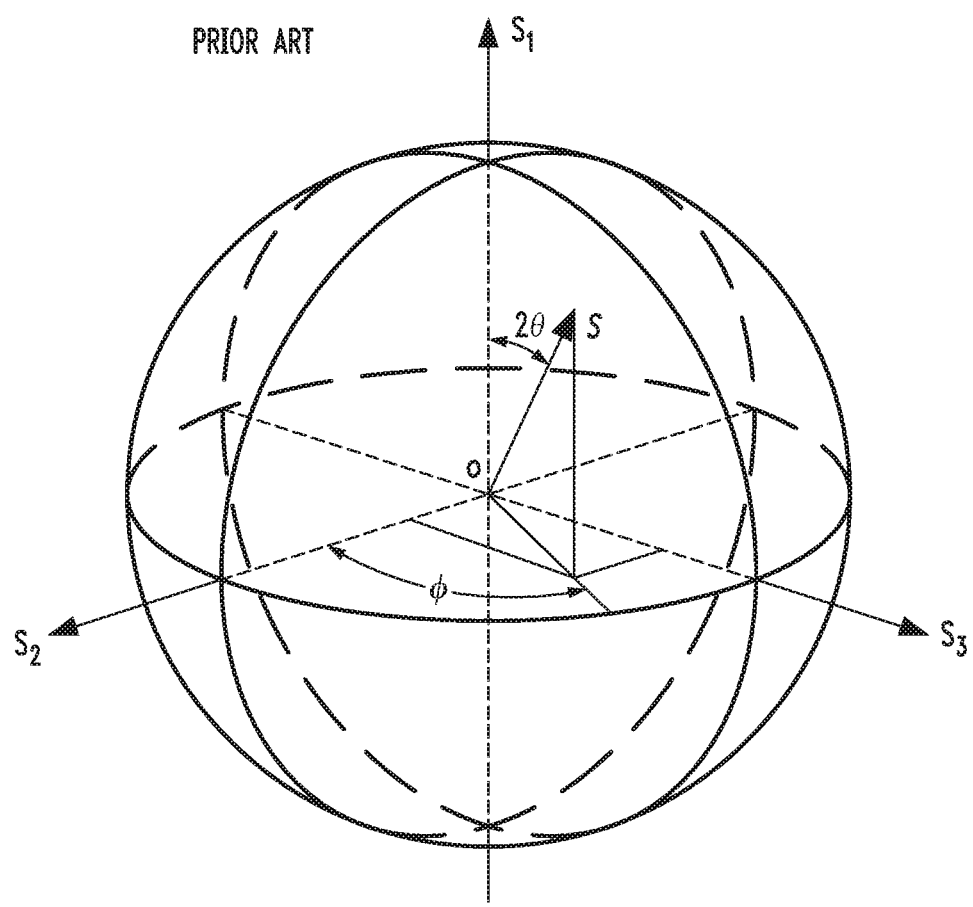
FIG. 1 shows a graphical representation of an SOP using the Poincare sphere.

FIG. 1 shows a graphical representation of an SOP using the Poincare sphere. Herein, the Poincare sphere is a sphere of radius P centered on the origin of the three-dimensional Cartesian coordinate system, the mutually orthogonal axes $S_1$, $S_2$, and $S_3$ of which represent the corresponding Stokes parameters of the optical field. The radius P represents the optical power and is expressed by Eq. (3):

$$P=\sqrt{S_1^2+S_2^2+S_3^2} \quad (3)$$

For a given optical power P, different SOPs can be mapped to different respective points on the surface of the Poincare sphere. For example, the vector S shown in FIG. 1 represents one of such SOPs. SOP rotation can then be visualized as the corresponding rotation of the vector S.

In some cases, it is convenient to use a unity-radius Poincare sphere, for which P=1. The unity-radius Poincare sphere can be obtained by normalizing the Stokes parameters with respect to the optical power P. For the unity-radius Poincare sphere, the angles θ and φ are related to the normalized Stokes parameters $S_1'$, $S_2'$, and $S_3'$ as follows:

$$S_1' = \frac{S_1}{P} = \cos(2\theta) \quad (4a)$$

$$S_2' = \frac{S_2}{P} = \sin(2\theta)\cos(\phi) \quad (4b)$$

$$S_3' = \frac{S_3}{P} = \sin(2\theta)\sin(\phi) \quad (4c)$$

As used herein, the term "polarization tracking" refers to time-resolved measurements of the SOP of an optical signal. In some embodiments, such polarization tracking may include determination, as a function of time, of the angles θ and φ. In some other embodiments, such polarization tracking may include determination, as a function of time, of the Stokes parameters $S_1'$, $S_2'$, and $S_3'$ of the normalized Stokes vector $S'=(1\ S_1'\ S_2'\ S_3')^T$, where the superscript T means transposed. In yet some other embodiments, such polarization tracking may include determination, as a function of time, of the Stokes parameters $S_0=P$, $S_1$, $S_2$, and $S_3$ of the non-normalized Stokes vector $S=(S_0\ S_1\ S_2\ S_3)^T$.

An Optical Supervisory Channel (OSC) uses an out-of-band wavelength (e.g., 1510 nm, 1620 nm, 1310 nm, or some proprietary wavelength) that is outside the link's amplification band, e.g., the Erbium-doped fiber amplifier (EDFA) band. The OSC signal is typically used to carry control information about the corresponding in-band wavelength-division-multiplexed (WDM) optical signal and/or conditions at the remote optical terminal or amplifier. It may also be used for remote software updates or upgrades and some network-management operations.

As used herein, the term "in-band" refers to one or more optical carriers from a WDM set used for user (e.g., network-customer, payload) data transport through the corresponding fiber-optic link. Subcarriers or dither tones that are spectrally located within the bandwidth allocated to the optical carrier are considered to be in-band. The term "out-of-band" should be construed as indicating the use of communications means that do not rely on or utilize any of the optical carriers from the WDM set or any of their subcarriers. An example of such out-of-band communications means is the Internet Protocol (IP) implemented over a wireline, wireless, or OSC connection. Note that, despite being "optical," an OSC signal is not considered to be an in-band wavelength channel because an OSC signal does not typically transport user data. Rather, as already indicated above, an OSC signal typically carries non-user signals, such as control signals and/or network-operator data.

A typical OSC data rate in legacy communication systems is 155 Mb/s. The next generation OSC may employ data rates of up to 1 Gb/s. In conventional systems, OSC-data transmission is implemented using some form of intensity-modulation (IM) at the OSC transmitter and direct detection (DD) at the OSC receiver, often referred-to as the IM/DD technique. A direct-detection optical receiver typically employs a light detector configured to measure only light intensities, e.g., the light detector may be a single photo-diode as opposed to a pair of photodiodes configured for differential detection. Such a direct-detection optical receiver does not typically employ an optical hybrid and is not configured to determine the phase of the data-carrying optical signal.

Some in-band optical channels may be configured to use polarization division multiplexing (PDM), which is based on transmitting independently modulated data signals over orthogonal polarizations of the same optical carrier. PDM is typically used together with phase modulation, Quadrature Phase Shift Keying (QPSK), or Quadrature Amplitude Modulation (QAM). PDM and WDM can be used concurrently for at least some groups of in-band optical channels.

An optical PDM receiver may employ an adaptive digital filter, e.g., a multiple-input/multiple-output (MIMO) equalizer, for electronic polarization demultiplexing. Depending on the operative constellation(s), a constant-modulus algorithm (CMA) or a multi-modulus algorithm (MMA) may be employed by the filter controller to adaptively update the filter-tap coefficients. An error signal used by the filter controller to drive the updates is typically produced by averaging slicing decisions over multiple signaling intervals (symbol time slots). As such, the speed with which the adaptive filter can react to SOP changes is inherently limited by the performed averaging and by the symbol rate of the PDM signal. For example, filter-update speeds that can accommodate the SOP-rotation speeds on the order of 1 Mrad/s may not be feasible with such adaptive digital filters. As a result, such adaptive digital filters do not lend themselves for polarization tracking at such SOP-rotation speeds.

At least some of the above-indicated problems in the state of the art can be addressed using at least some embodiments disclosed herein. An example embodiment may be based on an OSC receiver whose optical front end is modified to include a polarization-diversity coherent optical receiver connected to receive a conventional intensity-modulated OSC signal. Four quadrature components of the received OSC signal detected by the polarization-diversity coherent optical receiver are sampled at a relatively high sampling rate (e.g., at a rate that is higher than the symbol rate of the OSC signal) and then used to calculate the Stokes parameters of the OSC signal. As a result, the Stokes parameters can be updated at the high sampling rate, which can be suitably selected to enable polarization tracking at relatively high SOP-rotation speeds, e.g., of several Mrad/s or even higher. The four detected quadrature components are appropriately combined in the receiver DSP to determine the intensity of the received OSC signal, which can then be used in a conventional manner to recover the OSC data encoded therein.

Figure 2:
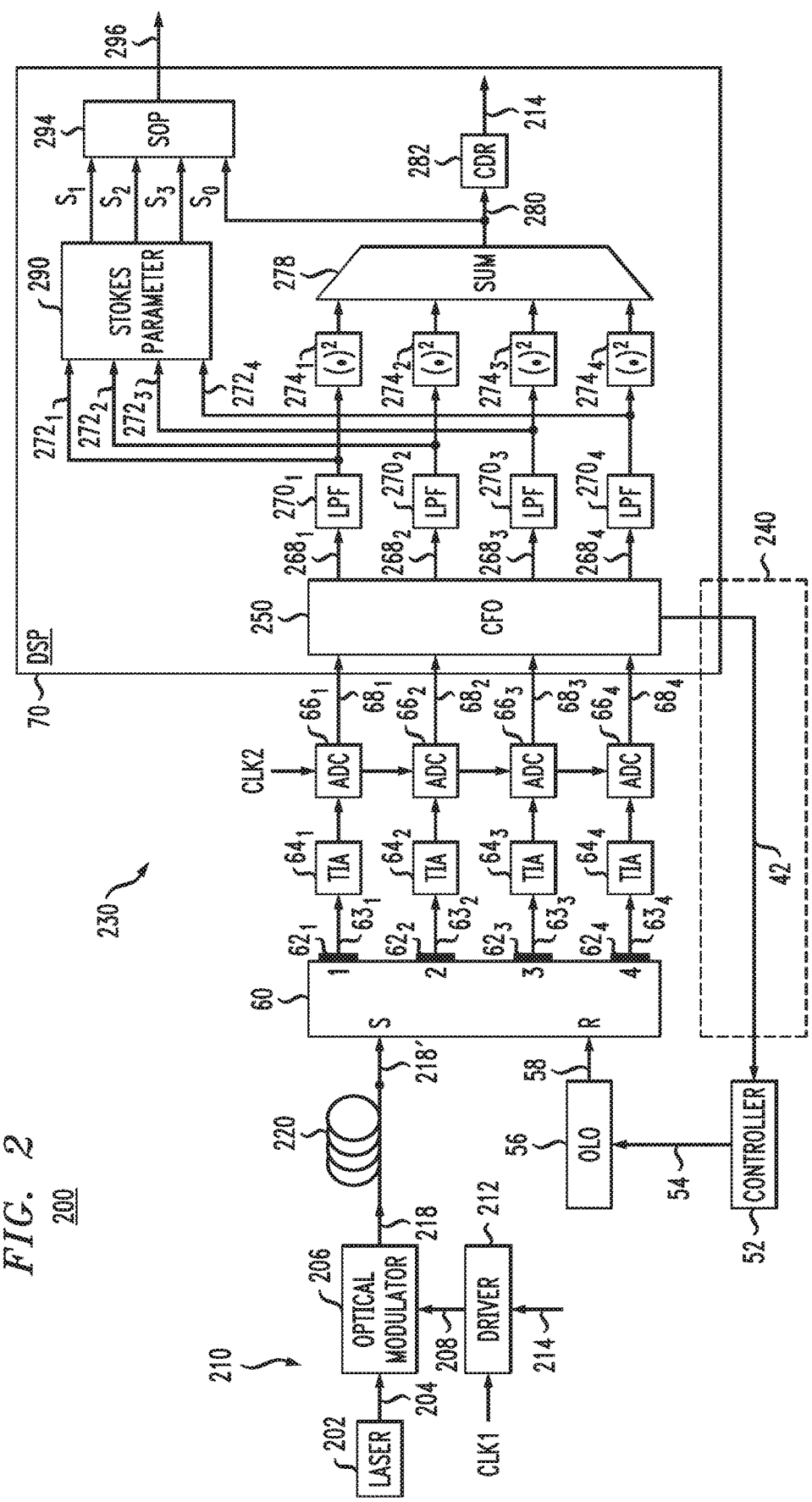
FIG. 2 shows a block diagram of an optical communication and/or monitoring system, with a polarization tracking apparatus at the optical data receiver thereof, according to an embodiment.

FIG. 2 shows a block diagram of an optical communication and/or monitoring system 200 according to an embodiment. For illustration purposes and without any implied limitations, system 200 is described below in reference to an Optical Supervisory Channel (OSC). However, alternative embodiments in which system 200 is used for a different (from OSC) application are also possible.

As shown in FIG. 2, system 200 comprises an optical data transmitter 210 and an optical data receiver 230 optically connected via an optical-fiber-communication link 220. In an example embodiment, link 220 comprises one or more spans of optical fiber or fiber-optic cable, e.g., one or more spans of standard single-mode optical fiber. In some embodiments, link 220 may include one or more optional optical amplifiers (not explicitly shown in FIG. 2), each connected between two corresponding fiber spans. In some embodiments, link 220 may include other optical elements, e.g., one or more optical filters, splitters, switches, etc. In some alternative embodiments, some portions of link 220 may be implemented using planar optical waveguides and/or free-space optical connections.

Optical data transmitter 210 comprises a laser source 202, an optical modulator 206, and an electrical drive circuit 212 connected as indicated in FIG. 2.

In operation, laser source 202 generates an optical carrier 204 having a carrier frequency $f_c$. Optical modulator 206 then operates to modulate optical carrier 204 in response to an electrical drive signal 208. A resulting modulated optical signal 218 is then applied to optical link 220.

In an example embodiment, optical modulator 206 can be an optical intensity modulator, e.g., an electro-absorption modulator (EAM), or an optical amplitude modulator, e.g., an appropriately configured Mach-Zehnder modulator (MZM). Drive circuit 212 is configured to generate electrical drive signal 208 for optical modulator 206, e.g., as known in the pertinent art, in response to an electrical data signal 214 and a clock signal CLK1. Clock signal CLK1 determines the symbol rate, $R_1$, at which optical signal 218 is modulated. In some embodiments, electrical data signal 214 may be an OSC data signal. In some embodiments, electrical data signal 214 may be an amplitude-modulated electrical data signal.

In an example embodiment, optical signal 218 is not a PDM signal and is generated to carry a single optical-symbol stream corresponding to data signal 214. In some embodiments, optical signal 218 may be linearly polarized, e.g., have a fixed linear polarization. After propagating through link 220, optical signal 218 becomes optical signal 218', which is applied to optical data receiver 230. Optical signal 218' may differ somewhat from optical signal 218 because link 220 typically imposes certain signal distortions, e.g., time-varying distortions well known to those skilled in the pertinent art. For example, link 220 may cause the SOP of optical signal 218' to differ from the SOP of optical signal 218, e.g., due to the above-mentioned time-dependent SOP rotation in the optical fiber.

A front-end circuit of optical receiver 230 comprises a polarization-diversity optical hybrid 60, light detectors $62_1$-$62_4$, transimpedance amplifiers (TIAs) $64_1$-$64_4$, analog-to-digital converters (ADCs) $66_1$-$66_4$, and an optical local-oscillator (OLO) source (e.g., laser) 56. Optical hybrid 60 has (i) two input ports labeled S and R and (ii) four output ports labeled 1 through 4. Input port S receives optical signal 218' from link 220. Input port R receives an OLO signal 58 generated by OLO source 56. OLO signal 58 has a fixed linear polarization and further has an optical-carrier frequency that is sufficiently close to the frequency $f_c$ of optical carrier 204 to enable coherent (e.g., homodyne or intradyne) detection of optical signal 218'. In an example embodiment, OLO source 56 can be implemented using a relatively stable tunable laser whose output wavelength (optical frequency) can be controllably tuned, e.g., using a control signal 54.

In an example embodiment, optical hybrid 60 operates to mix optical signal 218' and OLO signal 58 to generate different mixed (e.g., by interference) optical signals (not explicitly shown in FIG. 2), the mixed optical signals being mixtures with different relative phase shifts and different polarization components of the optical signal 218'. Light detectors $62_1$-$62_4$ then convert the mixed optical signals into four electrical signals $63_1$-$63_4$ that are indicative of the quadratures of optical signal 218'. In some embodiments, light detectors $62_1$-$62_4$ may be balanced light detectors, e.g., each including a respective pair of photodiodes electrically connected in a differential configuration. For example, electrical signals $63_1$ and $63_2$ may be an analog I signal and an analog Q signal, respectively, corresponding to a first (e.g., horizontal, X) polarization component of signal 218'. These I and Q signals provide measurements of two quadratures (e.g., the in-phase and quadrature components, often referred to as the I and Q quadratures or components) of the first polarization of signal 218'. Electrical signals $63_3$ and $63_4$ may similarly be an analog I signal and an analog Q signal, respectively, corresponding to a second (e.g., vertical, Y) polarization component of signal 218'. These I and Q signals may provide measurements of the I and Q quadratures of the second polarization of signal 218'. In some alternative embodiments, optical mixers that produce signal components relatively phase-shifted by a phase shift different from 90 degrees may also be used. For example, in some embodiments, the relative phase shift can be from the range between 45 and 135 degrees.

Each of electrical signals $63_1$-$63_4$ is amplified using a respective one of TIAs $64_1$-$64_4$, and the corresponding amplified electrical signals are converted into digital form using ADCs $66_1$-$66_4$. Each of the resulting digital signals $68_1$-$68_4$ produced by ADCs $66_1$-$66_4$ carries a stream of digital samples of the corresponding analog waveform, with the digital samples being produced by the corresponding ADC 68 at the sampling rate, $R_2$, determined by a clock signal CLK2 applied to the ADCs $66_1$-$66_4$. In an example embodiment, the sampling rate $R_2$ is greater than the symbol rate $R_1$. In some embodiments, the sampling rate $R_2$ may be greater than the symbol rate $R_1$ by a factor of four or by a factor of ten or more.

Digital signals $68_1$-$68_4$ are processed by a digital signal processor (DSP) 70 to: (i) recover the data signal 214 and (ii) perform time-resolved measurements of the SOP of optical signal 218'. The maximum time resolution for the SOP measurements that can be achieved based on digital signals $68_1$-$68_4$ is the reciprocal sampling rate of those digital signals, i.e., $1/R_2$. In an example embodiment, the sampling rate $R_2$ can be approximately $10^9$ samples/second or even higher. In some embodiments, the sampling rate $R_2$ can be selected to enable proper polarization tracking at relatively high SOP-rotation speeds, e.g., of several Mrad/s or even higher.

In an example embodiment, DSP 70 comprises a carrier-frequency-offset (CFO) circuit 250 connected to receive digital signals $68_1$-$68_4$. In some embodiments, optical data receiver 230 may have an optional feedback path 240 that connects CFO circuit 250 and a wavelength controller 52 of OLO source 56 as indicated in FIG. 2.

CFO circuit 250 operates to: (i) perform estimation of the frequency difference Δf between the carrier frequency of the OLO signal 58 and the frequency $f_c$ of the optical carrier 204, and (ii) apply frequency-offset correction to digital signals 68$_1$-68$_4$. The resulting frequency-offset-corrected digital signals 268$_1$-268$_4$ generated by CFO circuit 250 are directed further downstream in the chain of signal processing of DSP 70. In embodiments in which feedback path 240 is present, CFO circuit 250 also operates to generate a control signal 42, which may be appropriately processed in the feedback path and is delivered to controller 52 to cause the controller to generate an appropriate wavelength-tuning control signal 54 for OLO source 56. Example embodiments of CFO circuit 250 are described in more detail below in reference to FIG. 3.

DSP 70 further comprises low-pass filters (LPFs) 270$_1$-270$_4$, squaring circuits 274$_1$-274$_4$, an adder 278, a carrier and data recovery (CDR) circuit 282, a Stokes-parameter circuit 290, and an SOP circuit 294.

LPFs 270$_1$-270$_4$ operate to reduce high-frequency noise that might be present in digital signals 268$_1$-268$_4$. Two copies of each of the resulting filtered digital signals 272$_1$-272$_4$ generated by LPFs 270$_1$-270$_4$ are applied to the squaring circuits 274$_1$-274$_4$ and to the Stokes-parameter circuit 290, respectively. Each of squaring circuits 274$_1$-274$_4$ operates to compute a square of each received digital value, and the adder 278 sums up the computed squares for each sampling time, thereby generating a digital signal 280. A person of ordinary skill in the art will understand that digital signal 280 carries a stream of digital values proportional to the optical power P of optical signal 218'. Two copies of digital signal 280 are applied to CDR circuit 282 and SOP circuit 294, respectively. CDR circuit 282 operates in a conventional manner to: (i) recover the clock signal CLK1 from digital signal 280; and (ii) use the recovered clock signal to slice digital signal 280 at appropriate times, thereby substantially reconstructing the corresponding electrical data signal 214 used to drive optical modulator 206 at the optical data transmitter 210.

Stokes-parameter circuit 290 uses the received copy of digital signals 272$_1$-272$_4$ to compute three streams of digital values, which are labeled in FIG. 2 as $S_1$, $S_2$, and $S_3$, respectively. Each of these digital values is proportional to the corresponding one of the Stokes parameters $S_1$, $S_2$, and $S_3$ of optical signal 218'. In an example embodiment, this computation can be performed in accordance with Eqs. (6) and (9), e.g., as explained in more detail below.

SOP circuit 294 receives the streams $S_1$, $S_2$, and $S_3$ computed by the Stokes-parameter circuit 290. SOP circuit 294 further receives a copy of digital signal 280 generated by the adder 278, which provides digital values proportional by the Stokes parameter $S_0$ (=P) of optical signal 218'. Note that digital signal 280 and the streams $S_1$, $S_2$, and $S_3$ are each clocked at the rate of the clock signal CLK2. SOP circuit 294 uses the digital values received in each clock period to compose the corresponding non-normalized Stokes vector $S=(S_0\ S_1\ S_2\ S_3)^T$. A sequence of the composed Stokes vectors S may be time-stamped and stored in a non-volatile memory of the SOP circuit 294 to form a data set that represents the corresponding time-dependent Stokes vector S(t).

Figure 4A:
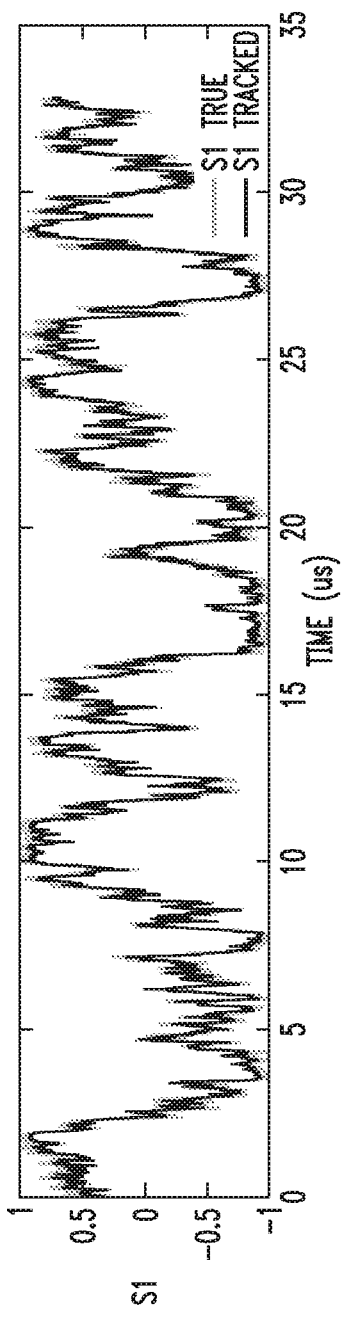
FIGS. 4A-4C graphically illustrate an example of polarization-tracking data that can be obtained in the optical communication and/or monitoring system of FIG. 2 according to an embodiment.
Figure 4B:
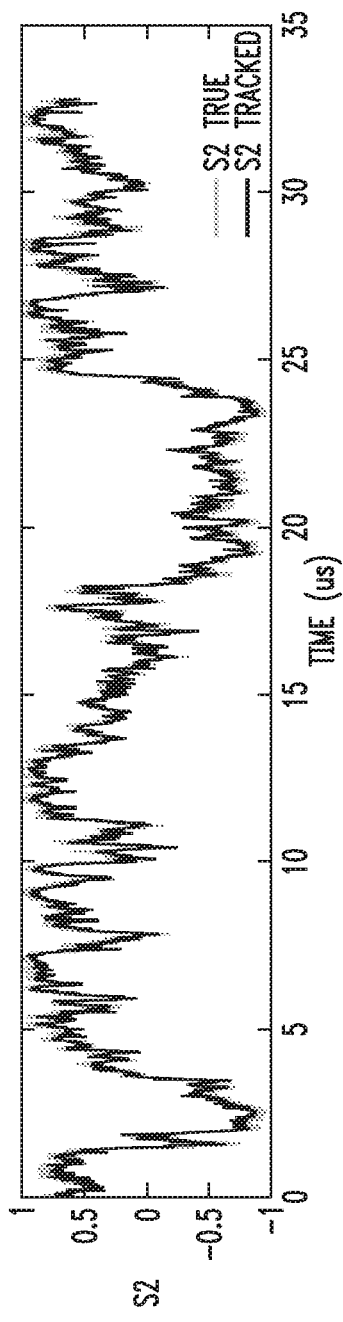
Figure 4C:
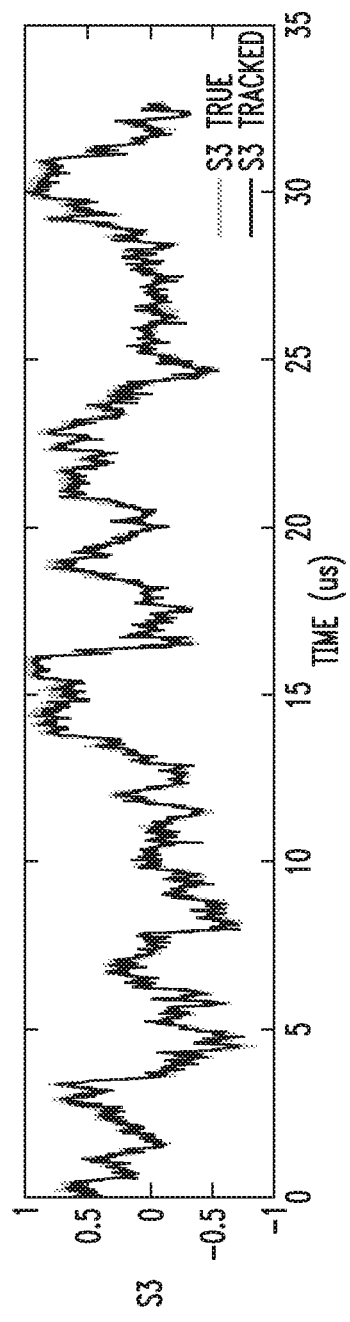

In some embodiments, SOP circuit 294 may be configured to further process the data set representing the time-dependent Stokes vector S(t). For example, the values of the Stokes parameter $S_0$ of the Stokes vector S(t) may be used to compute the time-dependent normalized Stokes vector S'(t). The time-dependent normalized Stokes vector S'(t) can then be used to compute the corresponding time-resolved values of the angles θ and ϕ (see, e.g., Eqs. (4a)-(4c)). The computed angles θ(t) and ϕ(t) and/or various components of the Stokes vectors S'(t) and S(t) can be exported via an output port 296 from DSP 70, e.g., for plotting and convenient viewing on a graphical display by the network operator and/or for further analysis by an appropriate network-management entity. A non-limiting example of the graphical SOP data that may be generated in this manner is shown in FIGS. 4A-4C.

In an example embodiment, DSP 70 may be programmed based on the following simplified mathematical model of the optical channel of system 200.

Optical signal 218 generated by optical data transmitter 210 has a fixed linear polarization, which can be assumed to be an X polarization. In this case, the Jones vector of optical signal 218 can be expressed as $(E_x^t\ 0)^T$. Using Eqs. (1)-(2), the Jones vector $(E_x^r\ E_y^r)^T$ of optical signal 218' can then be expressed as follows:

$$E_x^r = \cos(\theta) \cdot E_x^t \quad (5a)$$

$$E_y^r = e^{j\phi} \sin(\theta) \cdot E_x^t \quad (5b)$$

Herein, the values of $E_x^t$, $E_x^r$, and $E_y^r$ are generally complex valued.

The non-normalized Stokes vector $S=(S_0\ S_1\ S_2\ S_3)^T$ of optical signal 218' can be expressed as follows:

$$S_0 = |E_x^r|^2 + |E_y^r|^2 \quad (6a)$$

$$S_1 = |E_x^r|^2 - |E_y^r|^2 \quad (6b)$$

$$S_2 = 2\,\mathrm{Re}(E_x^r \cdot (E_y^r)^*) \quad (6c)$$

$$S_3 = -2\,\mathrm{Im}(E_x^r \cdot E_y^r)^*) \quad (6d)$$

where the "*" symbol in the superscript denotes complex conjugation.

When optical signal 218' is coherently detected in optical data receiver 230, the impact of the phase noise φ(t) and carrier frequency offset Δf of OLO signal 58 on the detected signals can be taken into account by introducing the corresponding factors into Eqs. (5a)-(5b), which then become:

$$E_x^r = \cos(\theta) \cdot E_x^t \cdot e^{j\varphi(t)} e^{2\pi j(\Delta f)t} \quad (7a)$$

$$E_y^r = e^{j\phi} \sin(\theta) \cdot E_x^t \cdot e^{j\varphi(t)} e^{2\pi j(\Delta f)t} \quad (7b)$$

By substituting Eqs. (7a)-(7b) into Eqs. (6a)-(6d), one obtains the following set of equations:

$$S_0 = |E_x^t|^2 \quad (8a)$$

$$S_1 = |E_x^t|^2 \cos(2\theta) \quad (8b)$$

$$S_2 = |E_x^t|^2 \sin(2\theta)\cos(\phi) \quad (8c)$$

$$S_3 = |E_x^t|^2 \sin(2\theta)\sin(\phi) \quad (8d)$$

After normalization by $|E_x^t|^2$, Eqs. (8b)-(8d) are identical to Eqs. (4a)-(4c), which confirms that measurements of the Stokes vector $S=(S_0\ S_1\ S_2\ S_3)^T$ of optical signal 218' can be used for polarization tracking in system 200. Further inspection of Eqs. (8a)-(8d) reveals that the phase noise φ(t) and carrier frequency offset Δf theoretically have no impact on the measured SOPs in a properly implemented optical data receiver 230. In practice, in some embodiments, special care still needs to be taken to ensure that the relative detuning of laser 202 and OLO source 56 does not become so large as to place some relevant signal components outside the bandwidth of the pertinent circuits of optical data receiver 230 during the polarization-tracking runtime. The corresponding feature of optical data receiver 230 can be implemented, e.g., using feedback path 240 as described further below in reference to FIG. 3 and continued reference to FIG. 2.

In an example embodiment, Stokes-parameter circuit 290 can be programmed to compute the streams $S_1$, $S_2$, and $S_3$ using Eqs. (6b)-6(d), in which:

$$E_x^r(n) = d_1(n) + j d_2(n) \quad (9a)$$

$$E_y^r(n) = d_3(n) + j d_4(n) \quad (9b)$$

where $d_1(n)$, $d_2(n)$, $d_3(n)$, and $d_4(n)$ denote the digital streams carried by digital signals $272_1$-$272_4$, respectively; and n is the time-slot index. SOP circuit 294 can then be programmed to form the data set that represents the corresponding time-dependent Stokes vector S(t) using (i) the streams $S_1$, $S_2$, and $S_3$ computed in this manner by Stokes-parameter circuit 290 and (ii) the corresponding stream of digital values provided by digital signal 280.

Figure 3:
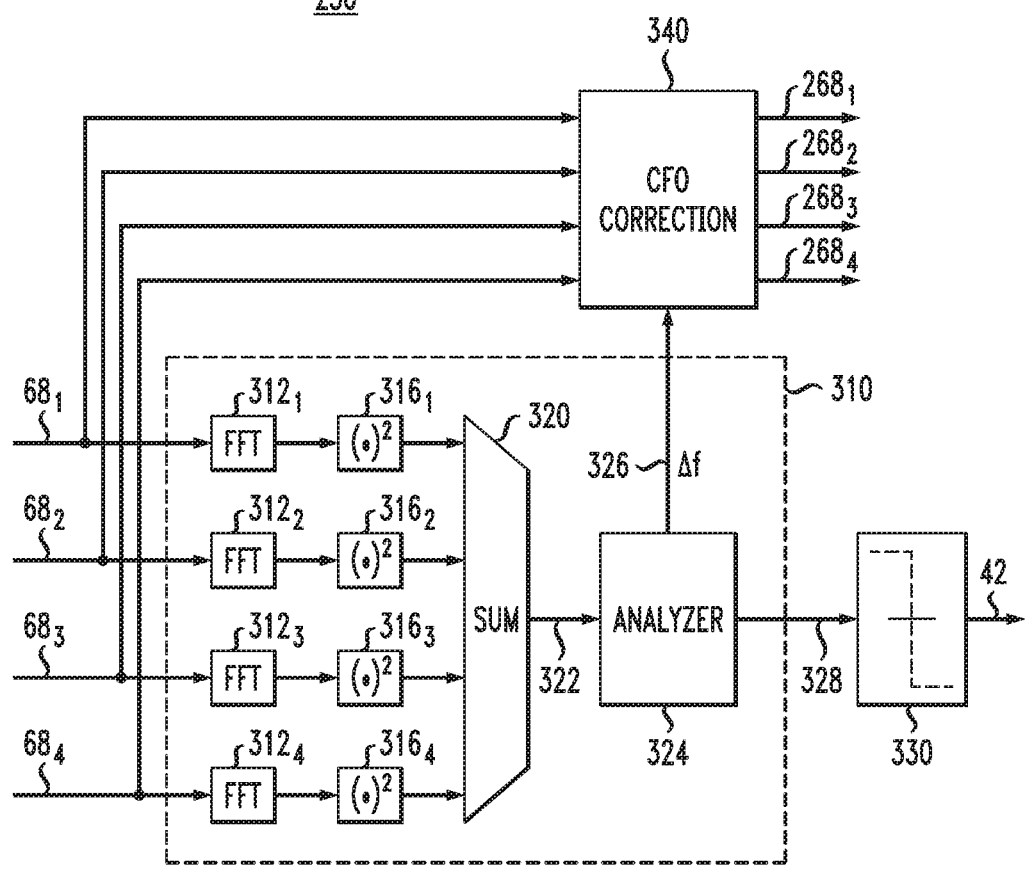
FIG. 3 shows a block diagram of a digital circuit that can be used in the optical data receiver shown in FIG. 2 according to an embodiment.

FIG. 3 shows a block diagram of CFO circuit 250 according to an embodiment. Digital signals $68_1$-$68_4$ and $268_1$-$268_4$ and control signal 42 are also shown in FIG. 3 to better indicate the relationship between the circuits shown in FIGS. 2 and 3.

As shown in FIG. 3, CFO circuit 250 comprises a spectrum analyzer 310 configured to compute and analyze a power spectrum of the down-converted signal resulting from the coherent detection of optical signal 218' in the front end of optical data receiver 230. In an example embodiment, spectrum analyzer 310 comprises fast-Fourier-transform (FFT) circuits $312_1$-$312_4$, squaring circuits $316_1$-$316_4$, and an adder 320 connected as indicated in FIG. 3 and is configured to compute in a conventional manner a power spectrum 322. An analyzer circuit 324 then operates to analyze the power spectrum 322 to determine: (i) the value of the carrier frequency offset $\Delta f$, and (ii) the peak-to-average power ratio (PAPR) of the power spectrum. The determined value of $\Delta f$ is then outputted via an output signal 326. The determined PAPR is outputted via an output signal 328.

When the relative detuning of laser 202 and OLO source 56 is relatively small, the power spectrum 322 contains a prominent peak at the frequency $f_0 = \Delta f$. Analyzer circuit 324 operates to detect this peak and determine its frequency $f_0$ and amplitude $A_0$. The amplitude $A_0$ is then used to calculate the spectrum's PAPR, which in this case can be relatively large. However, when the relative detuning of laser 202 and OLO source 56 is relatively large, the amplitude $A_0$ may be relatively small, which causes the PAPR to be small as well.

CFO circuit 250 further comprises a comparator 330 and a CFO-correction circuit 340.

Comparator 330 is connected to receive the PAPR outputted by spectrum analyzer 310 via signal 328. Comparator 330 operates to generate control signal 42 by comparing the received PAPR with a fixed threshold value. For example, comparator 330 may be configured to: (i) set the control signal 42 to binary one if the received PAPR is smaller than the fixed threshold value; and (ii) set the control signal 42 to binary zero if the received PAPR is greater than the fixed threshold value. The control signal 42 generated in this manner is applied to feedback path 240 (also see FIG. 2).

CFO-correction circuit 340 is connected to receive the value of $f_0$ outputted by spectrum analyzer 310 via signal 326. In an example embodiment, CFO-correction circuit 340 is configured to perform CFO correction in accordance with Eqs. (10a)-(10d):

$$I_x' = I_x \cos(2\pi f_0 t) + Q_x \sin(2\pi f_0 t) \quad (10a)$$

$$Q_x' = -I_x \sin(2\pi f_0 t) + Q_x \cos(2\pi f_0 t) \quad (10b)$$

$$I_y' = I_y \cos(2\pi f_0 t) + Q_y \sin(2\pi f_0 t) \quad (10c)$$

$$Q_y' = -I_y \sin(2\pi f_0 t) + Q_y \cos(2\pi f_0 t) \quad (10d)$$

where $I_x$, $Q_x$, $I_y$, and $Q_y$, are the digital values provided by signals $68_1$-$68_4$, respectively, at time t; and $I_x'$, $Q_x'$, $I_y'$, and $Q_y'$ are the corresponding digital values computed for signals $268_1$-$268_4$, respectively.

Referring back to FIG. 2, when control signal 42 is at binary zero, wavelength controller 52 lets OLO source 56 run in its current configuration, i.e., no controlled wavelength tuning is performed thereby. However, when control signal 42 is at binary one, wavelength controller 52 generates an appropriate control signal 54 to cause OLO source 56 to change the carrier frequency $f_c$, e.g., until control signal 42 resets back to binary zero. In some embodiments, wavelength controller 52 may include a phase-lock-loop (PLL) circuit, a thermo-electric cooler, and/or other suitable circuitry conventionally used to implement wavelength tuning.

FIGS. 4A-4C graphically show an example of polarization-tracking data that can be obtained in system 200 according to an embodiment. More specifically, FIGS. 4A-4C graphically show the normalized Stokes parameters $S_1'$, $S_2'$, and $S_3'$, respectively, as a function of time over a 32-μs-long time interval. The traces labeled as "true" represent the simulated link conditions under which the mean SOP-rotation speed is 20 Mrad/s. The traces labeled as "tracked" represent estimated polarization-tracking data that may be obtained under these link conditions using an embodiment of optical data receiver 230 in which the ADCs $66_1$-$66_4$ are clocked at $4 \times 10^9$ samples/s. Excellent agreement between the "true" and "tracked" traces can be easily noted in each of FIGS. 4A-4C.

Some embodiments of the disclosed polarization tracking methods and apparatus can be used, e.g., to detect and/or identify some specific (e.g., undesirable) events along the optical fiber line 220 (FIG. 2). Such events may include but are not limited to lightning, strong mechanical vibrations (e.g., due to construction work or movement of heavy machinery), etc.

According to an example embodiment disclosed above, e.g., in the summary section and/or in reference to any one or any combination of some or all of FIGS. 1-4, provided is an apparatus comprising: an optical data receiver (e.g., 230, FIG. 2) for an intensity-modulated optical data signal (e.g., 218', FIG. 2), the optical data receiver comprising: an optical hybrid (e.g., 60, FIG. 2) configured to mix the intensity-modulated optical data signal and an optical local-oscillator signal (e.g., 58, FIG. 2) to generate first and second pluralities of mixed optical signals, the first plurality corresponding to a first polarization of the optical data signal, the second plurality corresponding to a different second polarization of the optical data signal; a first plurality of light detectors (e.g., $62_1$-$62_2$, FIG. 2) connected to generate first and second streams of digitalizations (e.g., $68_1$-$68_2$, FIG. 2) in response to the first plurality of mixed optical signals, the first and second streams of digitalizations providing measurements of different phase components (e.g., I and Q quadratures) of the first polarization of the optical data signal; a second plurality of light detectors (e.g., $62_3$-$62_4$, FIG. 2) connected to generate third and fourth streams of digitalizations (e.g., $68_3$-$68_4$, FIG. 2) in response to the second plurality of mixed optical signals, the third and fourth streams of digitalizations providing measurements of different phase components (e.g., I and Q quadratures) of the second polarization of the optical data signal; and a digital signal processor (e.g., 70, FIG. 2) configured to obtain time-resolved measurements of a state of polarization (SOP) of the intensity-modulated optical data signal based on the first, second, third, and fourth streams of digitalizations.

In some embodiments of the above apparatus, the digital signal processor is further configured to recover data (e.g., 214, FIG. 2) carried by the intensity-modulated optical data signal from a combination (e.g., 280, FIG. 2) of the first, second, third, and fourth streams of digitalizations.

In some embodiments of any of the above apparatus, the digital signal processor is configured to generate said combination to be proportional to optical power of the intensity-modulated optical data signal.

In some embodiments of any of the above apparatus, the first and second polarizations are mutually orthogonal.

In some embodiments of any of the above apparatus, the first and second polarizations are linearly independent polarizations of the intensity-modulated optical data signal.

In some embodiments of any of the above apparatus, the intensity-modulated optical data signal is intensity-modulated at a symbol rate (e.g., $R_1$); and wherein the digital signal processor is configured to obtain the time-resolved measurements of the SOP with a finer time resolution than one over the symbol rate (e.g., $\tau<1/R_1$).

In some embodiments of any of the above apparatus, the first, second, third, and fourth streams of digitalizations are characterized by a sampling rate (e.g., $R_2$); and wherein the digital signal processor is capable of obtaining the time-resolved measurements of the SOP with a time resolution of one over the sampling rate (e.g., $\tau=1/R_2$).

In some embodiments of any of the above apparatus, the intensity-modulated optical data signal is intensity-modulated at a symbol rate (e.g., $R_1$); and wherein the sampling rate is greater than the symbol rate by a factor of two or more (e.g., $R_2>2R_1$).

In some embodiments of any of the above apparatus, the time-resolved measurements of the SOP comprise time-resolved measurements of two or more Stokes parameters (e.g., shown in FIGS. 4A-4C) of the intensity-modulated optical data signal.

In some embodiments of any of the above apparatus, the time-resolved measurements of the SOP comprise time-resolved measurements of at least one of an elevation polarization-rotation angle (e.g., $\theta$, Eq. (2)) and an azimuth polarization-rotation angle (e.g., $\phi$, Eq. (2)).

In some embodiments of any of the above apparatus, the intensity-modulated optical data signal is an Optical-Supervisory-Channel signal.

In some embodiments of any of the above apparatus, the optical data receiver further comprises a laser source (e.g., 56, FIG. 2) to generate the optical local-oscillator signal and a feedback path (e.g., 240, FIG. 2) from the digital signal processor to the laser source to control relative detuning of carrier frequency of the optical local-oscillator signal.

In some embodiments of any of the above apparatus, the digital signal processor comprises a spectrum analyzer (e.g., 310, FIG. 3) configured to send a control signal (e.g., 42, FIGS. 2, 3) through the feedback path to a laser-source controller (e.g., 52, FIG. 2).

In some embodiments of any of the above apparatus, the digital signal processor comprises a digital circuit (e.g., 250, FIGS. 2, 3) configured to compensate for a difference between optical carrier frequencies of the optical local-oscillator signal and the intensity-modulated optical data signal.

In some embodiments of any of the above apparatus, the optical data receiver further comprises: a memory (e.g., 294, FIG. 2) to store a data set representing a plurality of time-stamped Stokes vectors of the intensity-modulated optical data signal obtained using the time-resolved measurements of the SOP; and an output port (e.g., 296, FIG. 2) to export the data set from the optical data receiver.

In some embodiments of any of the above apparatus, the digital signal processor does not include an adaptive digital filter capable of performing electronic polarization demultiplexing.

In some embodiments of any of the above apparatus, the apparatus further comprises an Optical-Supervisory-Channel transmitter (e.g., 210, FIG. 2) fiber-connected to the optical data receiver and configured to use intensity modulation to generate the intensity-modulated optical data signal.

According to another example embodiment disclosed above, e.g., in the summary section and/or in reference to any one or any combination of some or all of FIGS. 1-4, provided is an apparatus comprising: an optical data receiver (e.g., 230, FIG. 2) that comprises: a polarization-diversity optical hybrid (e.g., 60, FIG. 2) configured to mix an optical data signal (e.g., 218', FIG. 2) and an optical local-oscillator signal (e.g., 58, FIG. 2) to generate first and second pluralities of mixed optical signals, the first plurality corresponding to a first polarization of the optical data signal, the second plurality corresponding to a second polarization of the optical data signal, the first and second polarizations being mutually orthogonal; a first plurality of light detectors (e.g., $62_1$-$62_2$, FIG. 2) connected to generate first and second streams of digitalizations (e.g., $68_1$-$68_2$, FIG. 2) in response to the first plurality of mixed optical signals, the first and second streams of digitalizations providing measurements of I and Q quadratures of the first polarization of the optical data signal; a second plurality of light detectors (e.g., $62_3$-$62_4$, FIG. 2) connected to generate third and fourth streams of digitalizations (e.g., $68_3$-$68_4$, FIG. 2) in response to the second plurality of mixed optical signals, the third and fourth streams of digitalizations providing measurements of I and Q quadratures of the second polarization of the optical data signal; and a digital signal processor (e.g., 70, FIG. 2) configured to: obtain time-resolved measurements of a state of polarization (SOP) of the optical data signal based on the first, second, third, and fourth streams of digitalizations; combine the first, second, third, and fourth streams of digitalizations to generate a digital signal (e.g., 280, FIG. 2) proportional to optical power of the optical data signal; and recover data (e.g., 214, FIG. 2) encoded in the optical data signal from the digital signal.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Unless otherwise specified herein, in addition to its plain meaning, the conjunction "if" may also or alternatively be construed to mean "when" or "upon" or "in response to determining" or "in response to detecting," which construal may depend on the corresponding specific context. For example, the phrase "if it is determined" or "if [a stated condition] is detected" may be construed to mean "upon determining" or "in response to determining" or "upon detecting [the stated condition or event]" or "in response to detecting [the stated condition or event]."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. The same type of distinction applies to the use of terms "attached" and "directly attached," as applied to a description of a physical structure. For example, a relatively thin layer of adhesive or other suitable binder can be used to implement such "direct attachment" of the two corresponding components in such physical structure.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An apparatus comprising an optical data receiver for an intensity-modulated optical data signal intensity-modulated at a symbol rate, the optical data receiver comprising:
    an optical hybrid configured to mix the intensity-modulated optical data signal and an optical local-oscillator signal to generate first and second pluralities of mixed optical signals, the first plurality corresponding to a first polarization of the optical data signal, the second plurality corresponding to a different second polarization of the optical data signal;
    a first plurality of light detectors connected to generate first and second streams of digitalizations in response to the first plurality of mixed optical signals, the first and second streams of digitalizations providing measurements of different phase components of the first polarization of the optical data signal;
    a second plurality of light detectors connected to generate third and fourth streams of digitalizations in response to the second plurality of mixed optical signals, the third and fourth streams of digitalizations providing measurements of different phase components of the second polarization of the optical data signal; and
    a digital signal processor configured to:
        obtain time-resolved measurements of a state of polarization (SOP), with a finer time resolution than one over the symbol rate, of the intensity-modulated optical data signal based on the first, second, third, and fourth streams of digitalizations;
        compute, using a squaring circuit, a square of each received value of the first, second, third, and fourth streams of digitalizations; and
        generate a combination, using an adder, by summing the computed squares of the first, second, third, and fourth streams of digitalizations for each sampling time, to be proportional to optical power of the intensity-modulated optical data signal; and
        recover, using a carrier and data recovery circuit, data carried by the intensity-modulated optical data signal from the combination.

2. The apparatus of claim 1, wherein the first and second polarizations are mutually orthogonal.

3. The apparatus of claim 1, wherein the first and second polarizations are linearly independent polarizations of the intensity-modulated optical data signal.

4. The apparatus of claim 1,
    wherein the first, second, third, and fourth streams of digitalizations are characterized by a sampling rate; and
    wherein the digital signal processor is capable of obtaining the time-resolved measurements of the SOP with a time resolution of one over the sampling rate.

5. The apparatus of claim 4,
    wherein the sampling rate is greater than the symbol rate by a factor of two or more.

6. The apparatus of claim 1, wherein the time-resolved measurements of the SOP comprise time-resolved measurements of two or more Stokes parameters of the intensity-modulated optical data signal.

7. The apparatus of claim 1, wherein the time-resolved measurements of the SOP comprise time-resolved measurements of at least one of an elevation polarization-rotation angle and an azimuth polarization-rotation angle.

8. The apparatus of claim 1, wherein the intensity-modulated optical data signal is an Optical-Supervisory-Channel signal.

9. The apparatus of claim 1, wherein the optical data receiver further comprises a laser source to generate the optical local-oscillator signal and a feedback path from the digital signal processor to the laser source to control relative detuning of carrier frequency of the optical local-oscillator signal.

10. The apparatus of claim 9, wherein the digital signal processor comprises a spectrum analyzer configured to send a control signal through the feedback path to a laser-source controller.

11. The apparatus of claim 1, wherein the digital signal processor comprises a digital circuit configured to compensate for a difference between optical carrier frequencies of the optical local-oscillator signal and the intensity-modulated optical data signal.

12. The apparatus of claim 1, wherein the optical data receiver further comprises:
    a memory to store a data set representing a plurality of time-stamped Stokes vectors of the intensity-modulated optical data signal obtained using the time-resolved measurements of the SOP; and
    an output port to export the data set from the optical data receiver.

13. The apparatus of claim 1, wherein the digital signal processor does not include an adaptive digital filter capable of performing electronic polarization demultiplexing.

14. The apparatus of claim 1, further comprising an Optical-Supervisory-Channel transmitter fiber-connected to the optical data receiver and configured to use intensity modulation to generate the intensity-modulated optical data signal.

* * * * *